US005127145A

United States Patent [19]

Ross

[11] Patent Number: 5,127,145

[45] Date of Patent: Jul. 7, 1992

[54] PROCESS FOR REMOVING PACKING

[75] Inventor: Mark S. Ross, Lawrenceville, N.J.

[73] Assignee: Mobil Oil Corporation, Fairfax, Va.

[21] Appl. No.: 530,130

[22] Filed: May 29, 1990

Related U.S. Application Data

[62] Division of Ser. No. 366,821, Jun. 15, 1989, Pat. No. 4,944,081.

[51] Int. Cl.[5] ........ B23P 14/04

[52] U.S. Cl. ........ 29/402.02; 29/235

[58] Field of Search ........ 29/262-264, 29/234, 235, 280, 282, 426.1, 402.02, 402.03; 294/95, 66

[56] References Cited

U.S. PATENT DOCUMENTS

| | | | |
|---|---|---|---|
| 1,458,076 | 6/1923 | Potts | 29/264 |
| 1,638,494 | 8/1927 | Lewis et al. | 294/96 |
| 2,809,059 | 10/1957 | Hillis . | |
| 3,654,686 | 4/1972 | McFarland et al. | 29/282 |
| 4,291,910 | 9/1981 | Maupate | 294/95 |
| 4,330,917 | 5/1982 | Dzurkovich | 29/264 |
| 4,377,956 | 3/1983 | Cooper | 294/95 |

*Primary Examiner*—Robert C. Watson
*Attorney, Agent, or Firm*—Alexander J. McKillop; Charles J. Speciale; Michael J. Mlotkowski

[57] ABSTRACT

A tool for the removal of soft packing material from fluidic equipment. The packing removal tool of the present invention comprises a shaft having first and second ends, the first end terminating in a substantially pointed tip, at least one barbed lever, pivotally mounted to said first end of said shaft and means for urging said barbed lever outward from said shaft.

4 Claims, 1 Drawing Sheet

PROCESS FOR REMOVING PACKING

This is a division of copending application Ser. No. 366,821, filed on Jun. 15, 1989 now U.S. Pat. No. 4,944,081.

FIELD OF THE INVENTION

This invention relates generally to tools for the repair of fluidic equipment; and, more particularly, to a novel tool for the removal of soft packing from valves, pumps and the like.

BACKGROUND OF THE INVENTION

Packings are used to prevent or minimize the leakage of fluids through the mechanical clearances usually present in fluidic equipment. Such clearances may exist in either the static or dynamic state. Generally, gaskets are installed in static clearances normally existing between parallel flanges or concentric cylinders; whereas for moving surfaces, dynamic packings are employed to fill mechanical clearances.

In functioning, to retain fluid under pressure, dynamic packings carry the hydraulic load. When no pressure exists, as in many oil-seal applications, the packing is mechanically loaded as by a spring or by its own resiliency. Dynamic packings therefore operate as bearings, thus indicating the need for lubrication to serve as both a separating film and a coolant. While the presence of such a film is vital for satisfactory service life, it also means that leakage will occur. Low-viscosity fluids and high pressures add to leakage problems, as both require thin films to minimize leakage. This causes higher friction and results in heat, which is the one most detrimental factor in packing life. Normally the fluid being sealed serves as the lubricant. Thus, where oils are involved, maximum efficiency is obtained. Next in order are clean water, solvents, and fluids, containing solids which progressively yield more unsatisfactory results unless supplemental lubrication is provided. While various types of dynamic packings exist, soft or jamb packings are best suited for rod or plunger service, since an adjustable gland is required. Many materials are employed, such as braided flax saturated with wax or viscous lubricants for water and aqueous solutions; braided asbestos similarly treated or often impregnated with polytretrafluoroethylene suspensoid for superior life under severe service conditions; laminated rubberized cotton fabric for hot water, low-pressure steam and ammonia; rolled rubberized asbestos fabric for steam; and rolled or twisted metal foil for high-temperature and high-pressure conditions. Packings containing woven or braided asbestos fibers are also made from wire-inserted yarns to gain additional strength.

Rotary shafts are generally packed with adjustable soft packings. The soft packings are of the same general type as those used for reciprocating service, with the asbestos braid lubricated with grease and graphite or with polytetrafluoroethylene suspensoid. The latter is the most popular for typical applications on centrifugal pumps and valve stems. For continuous rotary service, automatic packings are best restricted to low pressure because their tightness under high pressure tends to cause overheating. However, for intermittent service, as on valve stems, they are excellent.

In hydrocarbon refineries, petrochemical plants, and in the exploration and production of oil and gas, there are valves, pumps, and other equipment which utilize soft packing as a sealing media. These soft packings, which are typically graphite or teflon impregnated cord, have a limited service life and must be replaced. Replacement of such packing requires that the equipment be taken off line. Further, removal of the packing is often a time consuming process, resulting in high maintenance costs, equipment downtime and lost profitability.

To address the problems associated with the replacement of packing material, several improvements in equipment design have been proposed, as evidenced by U.S. Pat. Nos. 4,135,541 and 2,809,059, which are hereby incorporated by reference. While such designs may be beneficial, much of the equipment still utilized today requires the conventional, time-consuming manual replacement of soft packing.

While gaining access to the soft packing consumes a large portion of the time associated with packing replacement, the removal of the packing from the packing box itself is highly time consuming. Generally, to remove the packing a tool which may either resemble an ice-pick or a cork screw is used. Such a tool is worked into the packing material and the packing picked out. As those skilled in the art recognize, this is a tedious exercise which is made all the more so by the fact that one cannot gain a firm hold of the packing material after inserting such a tool. Several attempts are often required since the packing material often slips off of the tool.

Therefore, what is needed is a packing removing tool of improved design which is capable of reducing the time required to remove soft packing from valves, pumps and other such equipment.

SUMMARY OF THE INVENTION

According to the present invention, there is provided a packing removing tool which comprises a shaft, having first and second ends, the first end terminating in a substantially pointed tip, at least one barbed lever, pivotally mounted on the first end of the aforementioned shaft and means for urging the barbed lever outward from the shaft. The shaft may be rigid or flexible and may advantageously be hollow to incorporate user-operated actuation means.

It is an object of the present invention to provide a packing removal tool capable of reducing the time normally associated with the removal of soft packing from fluidic equipment.

It is another object of the present invention to provide a packing removal tool capable of resisting the tendency of the packing to slip off of the tool during removal operations.

It is yet another object of the present invention to provide an economical packing removal tool which overcomes the problems of prior art tools.

Other objects, aspects and the several advantages of the present invention will become apparent to those skilled in the art upon a reading of the specification and the claims appended thereto.

DESCRIPTION OF THE PREFERRED EMBODIMENTS

The present invention relates generally to a tool for use in the removal of defective soft packing from fluidic valves, pumps and the like. The invention is particularly suited to the removal of rope-like soft packing.

As previously discussed, existing packing removal tools are known to be inadequate. This is due primarily to the fact that they do not offer effective resistance to the natural tendency of soft packing to slip from the removal tool once inserted into the packing. Tool designs known in the art may have rigid or flexible shafts and either smooth, pointed tips or cork screw-like tips. Even the cork screw tipped tool does not offer effective resistance to slippage and is known to suffer from the same problems as the other known packing removal tool designs.

The present invention overcomes the problems previously encountered by providing at least one barbed lever which is urged outward upon insertion into the soft packing material. Two or more such levers may advantageously be provided.

Figure 1:
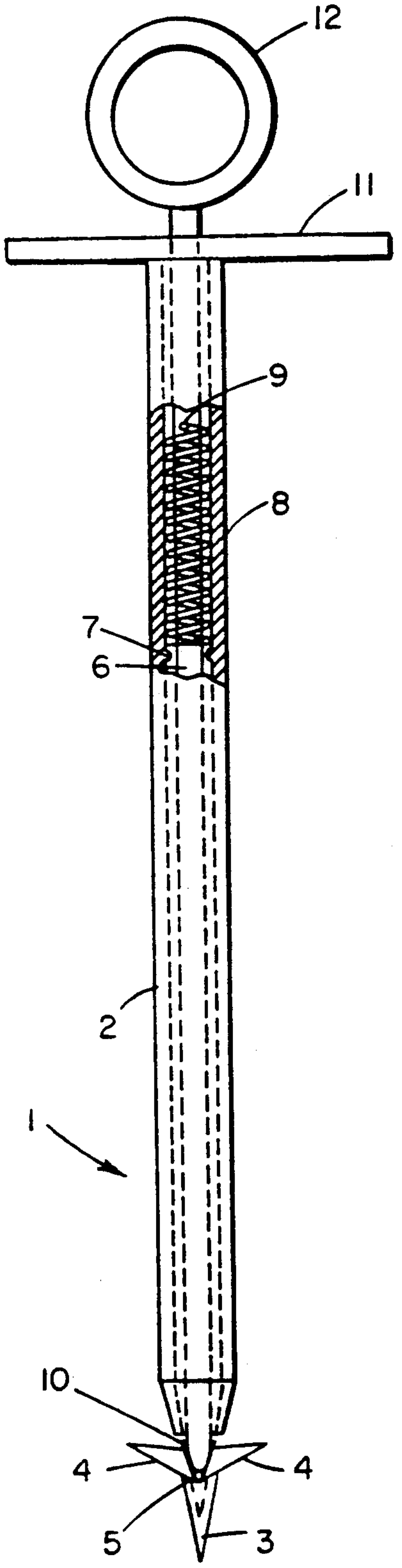
FIG. 1 is a side view of a packing removal tool of the present invention, a portion being cut away and shown in cross-section for clarity.

Reference is now made to FIG. 1, which as with all figures presented herein is given by way of example and illustration and not of limitation. FIG. 1 depicts a preferred embodiment of the packing removal tool of the present invention. In this embodiment, packing removal tool 1 is a spring-loaded device comprising a rigid hollow shaft 2 having a smooth substantially pointed tip section 3. While tip section 3 and hollow shaft 2 may consist of an assembly of two separate pieces, it may also be swaged or molded to form a single-pieced structure. Spring-loaded rod 6 provides the means to actuate the tool. As shown, at one end of shaft 6 is a conically-shaped structure 10 which, when actuated by the user of the tool, will urge barbed levers 4, pivotally mounted to tip 3 by pin 5, outward from tip section 3. While this structure is shown to be conically-shaped, it is within the scope of this invention to utilize other shapes to urge the barbed levers outward, as those skilled in the art will plainly recognize. At the outer end of rod 6 is handle 12, which may be a circular ring, as shown, or any other shape which serves the obvious intended purpose.

As shown in the cut-away section of FIG. 1, rod 6 is spring-loaded, causing the barbed levers to be normally retracted. To accomplish this preferred arrangement, spring-stop 7 is employed within shaft 2 to absorb the force of spring 8, rod nibs 9 (only one shown) are placed on rod 6 to engage spring 8, such engagement serving to urge rod 6 and conical structure 10 away from barbed levers 4 when no user-supplied force is applied to handle 12. To assist the user in applying force to handle 12, elongated grip 11 may be provided. As shown grip 11 is affixed to the non-pointed end of shaft 2.

Figure 2:
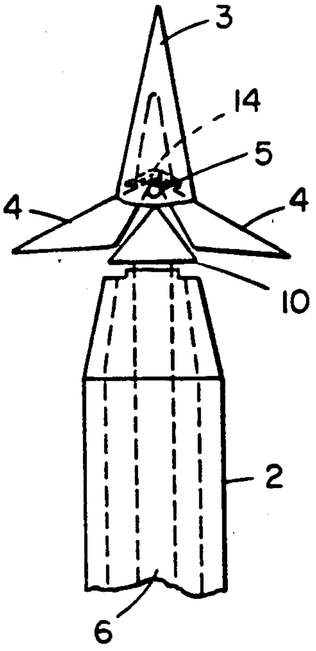
FIG. 2 is an enlarged fragmentary view of the tip portion of the tool depicted in FIG. 1 showing in greater detail a preferred means for engaging and urging the barbed levers outward.
Figure 4:
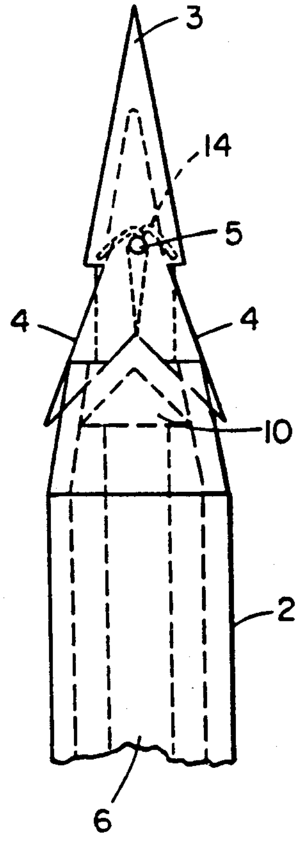
FIG. 4 is an enlarged fragmentary view of the tip portion of the tool depicted in FIG. 1 showing the barbed levers in the retracted position.

Reference is now made to FIG. 2 which provides an enlarged view of the tip portion of the packing removal tool 1 of FIG. 1. As shown, conically-shaped structure 10 of rod 6 is in the actuated position, urging barbed levers outward from tip section 3. As may be seen by referring to FIG. 4, when no force is applied to rod 6, the conically shaped structure 10 will retract into the larger portion of tip 3, permitting levers 4 to retract. To assure levers 4 remain in the retracted position, biasing spring 14 is employed. Spring 14, mounted on pin 5 together with the barbed levers, applies a force to the levers by contacting them on their upper outer surfaces.

Figure 3:
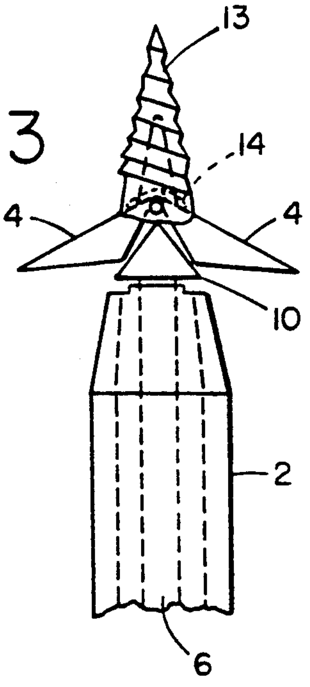
FIG. 3 is an enlarged fragmentary view of another embodiment of the tool of the present invention in which a screw-like tip portion is provided for engaging with the soft packing.

Variations of the above-described packing removal tool are envisioned as having utility. As shown in FIG. 3, a screw-like tip 13 may be provided which will assist the user in the insertion of the tool into the packing material. Additionally, although the tool has been described as having a rigid hollow shaft, a flexible shaft 2 may be advantageously employed, as those skilled in the art recognize. An arrangement much like a bicycle brake cable could be utilized to activate the barbed levers which would be installed in a rigid substantially pointed tip connected to one end of the cable.

Although a spring-loaded mechanism for retraction of the barbed levers has been described, it is within the scope of the present invention to utilize other mechanisms. As may be envisioned, a normally-open spring-loaded barbed lever arrangement (not shown) could be employed. In such an arrangement, the barbed levers would retract due to the force of insertion of the tool into the packing material and spring open during the extraction of the tool from the packing box. As can be seen, such a tool would not require the spring loaded rod arrangement shown in FIG. 1, thus simplifiying the tool considerably.

The following prophetic example is illustrative of the benefits which would accrue from the use of the present invention.

EXAMPLE

To remove soft packing from a fluidic device, a tool of the present invention is inserted into the packing. The plunger is depressed, which expands the barbed levers into the packing, anchoring the tool in the packing. With the plunger depressed, the tool is withdrawn from the packing box along with the packing. This procedure is continued until all the packing is removed. New packing can then be installed in the usual manner.

The invention and its broader aspects is not limited to the specific details shown and described. Although the invention has been described with preferred embodiments, it is to be understood that modifications and variations may be made without departing from the spirit and scope of the invention as those skilled in the art will readily understand.

What is claimed is:

1. A process for removing soft packing from a fluidic device comprising the steps of:

(a) inserting a packing removal tool into the soft packing, the tool comprising:
  (i) a shaft having first and second ends, said first end terminating in a substantially pointed tip;
  (ii) at least one barbed lever, pivotally mounted to said first end of said shaft; and
  (iii) means for urging said barbed lever outward from said shaft;
(b) expanding the barbed lever into the packing;
(c) anchoring the packing removal tool in the packing; and
(d) withdrawing the tool along with the packing.

2. The process of claim 1, wherein the tool inserted in step (a) further comprises means for actuating the urging means.

3. The process of claim 2, wherein the shaft of the tool inserted in step (a) is a hollow structure and the actuation means is contained within the shaft.

4. The process of claim 1, further comprising the step of repeating steps (a)-(c) until all the packing is removed.

* * * * *